United States Patent [19]

Ogawa

[11] 4,386,350
[45] May 31, 1983

[54] DISPLAY APPARATUS

[75] Inventor: Fumihiro Ogawa, Tokyo, Japan

[73] Assignee: Nippon Electric Co., Ltd., Tokyo, Japan

[21] Appl. No.: 163,233

[22] Filed: Jun. 25, 1980

[30] Foreign Application Priority Data

Dec. 25, 1979 [JP] Japan .................................. 54-80401
Dec. 25, 1979 [JP] Japan .................................. 54-168682

[51] Int. Cl.³ .............................................. G09G 3/18
[52] U.S. Cl. ...................... 340/765; 340/763; 340/805; 350/332; 350/336
[58] Field of Search ............... 340/765, 784, 763, 805; 350/330, 331, 332, 334, 336

[56] References Cited
U.S. PATENT DOCUMENTS

| | | | |
|---|---|---|---|
| 3,831,166 | 8/1974 | DeNardo | 340/765 |
| 4,105,297 | 8/1978 | Shimizu | 340/765 |
| 4,142,182 | 2/1979 | Kmetz | 340/765 |
| 4,212,011 | 7/1980 | Waldron | 340/784 |
| 4,241,344 | 12/1980 | Kmetz et al. | 340/765 |

*Primary Examiner*—Marshall M. Curtis
*Attorney, Agent, or Firm*—Sughrue, Mion, Zinn, Macpeak and Seas

[57] ABSTRACT

A display panel of the liquid crystal type provides a positive color display of segments or unit display areas using a reduced number of divided electrodes and an increased number of different driving signals. On one side of the panel there is a separate electrode encompassing each display area and all such electrodes include a display area. On the other side there are several common electrodes, each encompassing at least one display area and all cumulatively encompassing all of the display areas. A display area is selected for display by applying driving signals to its opposed electrodes such that substantially zero voltage is across the selected display area thereby leaving colored appearance in the selected display area. All other display areas and background areas are decolored by applying to the respective opposed electrodes driving signals resulting in a liquid crystal threshold voltage being applied across said non-selected display areas and said background areas.

7 Claims, 16 Drawing Figures

DISPLAY APPARATUS

BACKGROUND OF THE INVENTION

1. Field of the Art

The present invention relates to a display system for attaining a desired display pattern by applying an electric field between opposed electrodes, and more particularly to a display apparatus having a display panel with a novel electrode pattern and means for driving the display panel.

2. Description of the Prior Art

As display systems for achieving display by applying an electric field between opposed electrodes, various types of display systems are known such as those utilizing liquid crystals, those making use of gas discharge and those employing electroluminescence. In the following description, they will be explained, by way of example, in connection with liquid crystal display systems which have been widely popularized and developed even for color displays. In field of the color liquid crystal display systems, a guest-host type liquid display panel making use of a cholesteric-nematic mixed liquid crystal added with a pleochroic dye, is known as reported by D. L. White and G. N. Taylor in "Journal of Applied Physics, Vol. 45 (1974) pp. 4718-4723." This guest-host type liquid crystal display panel can work without an expensive polarizer which is necessary for a color liquid crystal display utilizing other electro-optical effects. Accordingly, not only is the display panel cheap, but it also has the advantage that the display becomes brighter and the visible angle becomes as wide as 140 degrees or more of a solid angle. The principle of operation of a guest-host type liquid crystal display is described as follows.

The surface of an electrode substrate making contact with liquid crystal molecules is subjected to a homeotropic surface treatment so that upon application of no voltage the liquid crystal molecules in the proximity of the electrode substrate may be oriented perpendicular to the substrate surface. Then the liquid crystal molecules in the liquid crystal bulk are oriented in a spiral manner, and the axis of the spiral is perpendicular to the substrate surface. The optical axes of the pleochroic dye molecules are likewise oriented in a spiral manner along the spiral orientation of the liquid crystal molecules in the bulk. Accordingly, among the incident light, the light component in the wavelength range inherent to the added pleochroic dye is absorbed, and hence the liquid crystal looks colored for an observer. When a voltage difference higher than the threshold voltage or the transition voltage of the liquid crystal is applied between the opposed electrodes, phase change occurs from a cholesteric phase to a nematic phase, so that the liquid crystal molecules take the orientation perpendicular to the electrode substrate, that is, the homeotropic alignment. Accordingly, the optical axes of the pleochroic dye molecules also become perpendicular to the electrode substrate, and thus since the direction of propagation of the incident light becomes parallel to the optical axes of the pleochroric die molecules, the liquid crystal looks to have the color of a reflecting plate placed on the backside of the panel, for instance, to be white for an observer.

As will be apparent from the above description, the common mode of use of the above-described type of color liquid crystal display panels is display of white characters on a colored background (hereinafter called "negative display"), because the character region is decolored by the presence of an applied field. While such a color display panel has the advantages of a very wide viewing angle, sufficient brightness and being fashionable, the display of colored characters on a white background (hereinafter called a "positive display") would be preferable to a negative display in view of human perception. In order to realize a positive display, a transparent electrode pattern must be designed so that a transition voltage can be applied across the background region of characters. In general, a display area of a display panel consists of unit display areas and background area. Each of the unit display areas can simply be called a segment. As well known, the Arabic numeral 0 to 9 can be shown by making use of seven segments, which are arrayed in a figure eight and which are different from the background area. In the conventional negative display, wanted segments needed for a desired numeral are energized while the background area remains unenergized. In the positive display, however, the background area and unwanted segments are energized while the wanted segments for display remain unenergized.

For a positive display, therefore, the electrode patterns on the front and back substrates must be different from the conventional negative display panel. In a positive display panel of a single digit, for instance, a primitive electrode patters can be thought of as follows. An electrode layer formed on a front substrate is divided into nine sections to provide nine individual electrodes. While seven electrodes are arrayed so as to selectively energize unwanted segments and its outside background, the remaining two electrodes are arrayed to energize only inside backgrounds of the figure eight. On the other hand, a back electrode substrate has eight divided electrodes closely arrayed to each other, and one of which is a so called common electrode to be used for energizing unwanted segments and two inside backgrounds. The common electrode is designed so as to face all segments and two front electrodes used only for the inside backgrounds. The remaining seven electrodes are arrayed so that each electrode faces each seven front electrodes except for the segment areas.

With this positive display panel, a desired numeral can be obtained by selectively applying the transition voltage between front and back electrodes. However, with regard to the number of channels of a driving circuits, 16 channels in total are required. This number is twice as many as the number of channels in the case of the conventional negative display, hence the driving circuit becomes expensive and the driving operation becomes complex.

SUMMARY OF THE INVENTION

It is an object of the present invention to provide a display panel having a novel electrode pattern.

Another object of the present invention is to provide a character display panel for positive display by making use of a figure of eight array of segments in which a number of electrodes is reduced as less as possible.

Still another object of the present invention is to provide a novel display apparatus, having the display panel with the aforementioned novel electrode pattern and means for driving the panel.

Yet another object of the present invention is to provide an analog display panel for bar-graph display or the like which has a novel electrode pattern.

According to the present invention, a display panel has a pair of opposed electrode substrates. One of the electrode substrates has a plurality of individual electrodes. Each of the individual electrodes has two regions opposed to segment and background areas, respectively. Another electrode substrate has a plurality of common electrodes. Each of the common electrodes has two regions opposed to segment and background areas, respectively. Furthermore, each segment region of the common electrodes is arrayed so as to oppose the segment region of a predetermined individual electrode, while each background region of the common electrode is arrayed so as not to oppose the background region of the above predetermined individual electrode.

More specifically, the segment region of each electrode is defined by a couple of outline sections of opposed electrodes. That is, one part and remaining part of the outline of a single segment region are shared by a part of outlines of the individual and common electrodes, respectively.

It is desirable to array every electrode on both substrates as close as possible. When the number of the common electrodes is two, the number of whole electrodes of the display panel can be reduced.

The above described display panel can be operated by applying a plurality of basic signals and selection signals to the common electrodes and individual electrodes, respectively. The selection signals applied to the individual electrodes can be called segment signals and background signals depending on whether the segment region of each individual electrode is unenergized or energized. The segment signal applied to the individual electrode facing the wanted display segment is determined to be substantially the same as the basic signal applied to the common electrode opposed to the above wanted segment so as not to exceed the threshold level of a display medium covered by the wanted segment, but to exceed that of a display medium covered by the background region thereof. On the other hand, the background signal applied to the individual electrode facing the unwanted segment is determined to be different from the basic signals applied to the common electrodes opposed to the selected individual electrode so as to exceed the threshold level of display medium covered by the whole region of the selected individual electrode.

DETAILED DESCRIPTION OF THE PRIOR ART

Figure 1A:
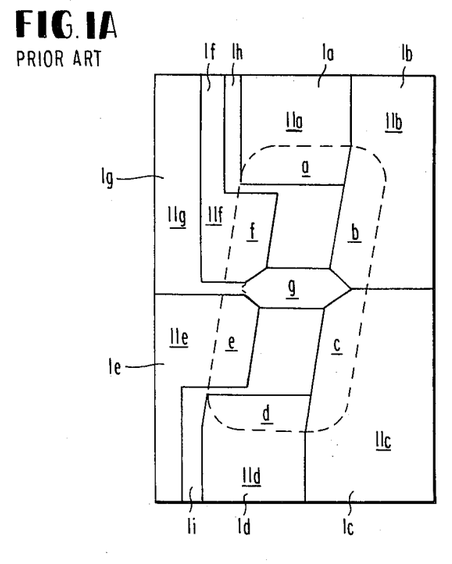
FIG. 1A is a representation of a severing pattern for a front electrode of a display panel for a prior art positive display.
Figure 1B:
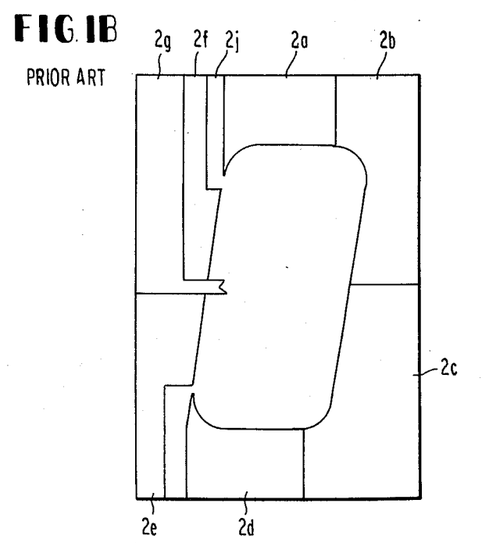
FIG. 1B is a representation of a severing pattern for a back electrode to be opposed to the front electrode shown in FIG. 1A.

As shown in FIG. 1A and FIG. 1B, a pair of opposed transparent substrates are provided with a plurality of electrodes to achieve a positive display for the Arabic numeral of a single digit. Nine electrodes on a front substrate and eight electrodes on a back substrate are arranged so that a part of each seven front electrodes $1a$, $1b$, $1c$, $1d$, $1e$, $1f$ and $1g$ are overlapped with a part of common back electrode $2j$, when viewed from a direction normal to the panel, to produce overlapped regions arranged in a figure eight. Each the overlapped regions can be called a unit display region, or simply called a segment. In a front electrode substrate, therefore, electrodes $1a$, $1b$, $1c$, $1d$, $1e$, $1f$ and $1g$ include regions to be called segments a, b, c, d, e, f and g, respectively, shown surrounded with solid lines and dotted lines in FIG. 1A. The residual regions $11a$, $11b$, $11c$, $11d$, $11e$, $11f$ and $11g$ adjacent to segments a–g can be called background regions. Two additional electrodes $1h$ and $1i$ do not include any segment regions.

In a back electrode substrate, on the other hand, electrodes $2a$, $2b$, $2c$, $2d$, $2e$, $2f$ and $2g$ are arrayed so as to be opposite to the background regions $11a$, $11b$, $11c$, $11d$, $11e$, $11f$ and $11g$ of the front electrodes $1a$–$1g$, respectively. The common electrode $2j$ has a region opposing the segments a–g and the electrodes $1h$ and $1i$.

In FIG. 1A and FIG. 1B, the solid lines represent the places where the electrode layer is removed by etching treatment. If the etching width is selected to be 20 to 100 microns, the insulation between the electrodes can be assured without degrading the quality of the positive display.

In such a display panel, the segment array must be designed such that in the front electrodes the two electrodes 1h and 1i have to pass through the gap space between the segments a and f and the gap space between the segments d and e. In view of human perception, however, it is desirable to make the width of the pass sections as small as possible. However, if the width of the pass section is reduced, then very narrow regions must be formed in the electrodes 1h and 1i, hence difficulty will arise in the etching treatment technique for these narrow regions, and the manufacturing yield will be also lowered. In addition, since the number of the electrodes is large, a number of channels in a driving circuit will be increased, and this prevents simplification of a display system. In order to improve such disadvantages, it is favorable to eliminate the two additional electrodes 1h and 1j.

DESCRIPTION OF PREFERRED EMBODIMENTS

Figure 2:
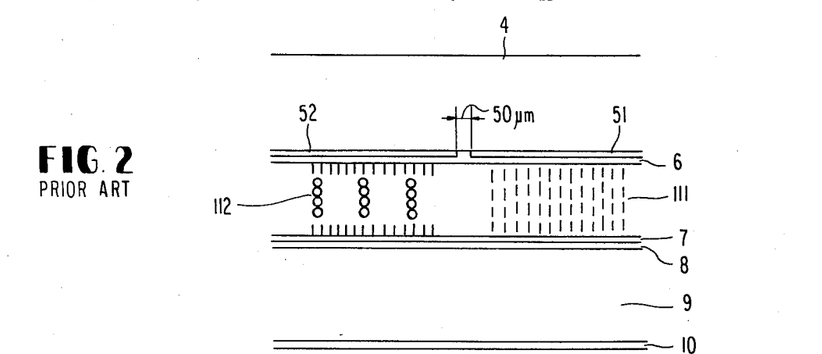
FIG. 2 is a partial cross-sectional view of a guest-host type liquid crystal display panel for explaining its operation principle.

As shown in FIG. 2, a guest-host type liquid crystal display panel has transparent electrodes 51 and 52 deposited on its front glass substrate 4, and the electrodes 51 and 52 are insulated from each other by selecting the gap distance therebetween to be 50 microns. Another transparent electrode 8 is deposited on a back surface glass substrate 9, and a reflecting plate 10 is provided on the opposite surface of the glass substrate 9. Homeotropic surfactant films 6 and 7 are deposited on the surfaces of the respective electrode substrates contacting with liquid crystal molecules. When the same electric signals are applied to the transparent electrodes 8 and 52 and an electric signal that is different from those applied to the transparent electrodes 8 and 52 is applied to the transparent electrode 51, liquid crystal molecules 111 opposed to the electrode 51 shows homeotropic alignment as shown in FIG. 2. As described previously, in the region where the liquid crystal molecules take homeotropic alignment, light absorption by a pleochroic dye would not occur, and hence the color of the reflecting plate 10 is observed. In the region of liquid crystal molecules 112 opposed to the electrode 52, no electric field is produced, and so, the region looks colored.

Figure 3A:
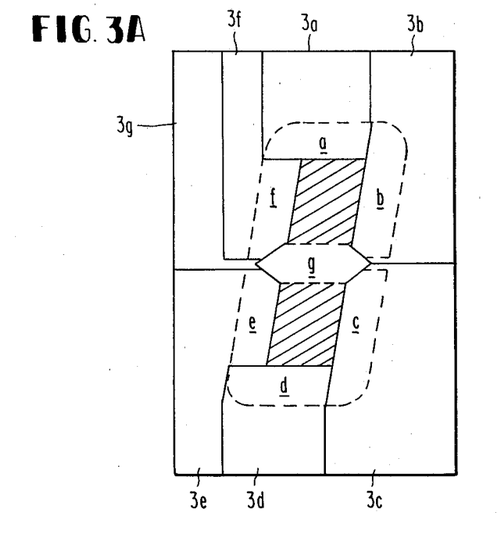
FIG. 3A is a plan view showing an electrode pattern on a front electrode substrate of a display panel according to a first preferred embodiment of the present invention.

Now electrode patterns to be used according to a first preferred embodiment of the present invention will be explained in detail with reference to FIGS. 3A and 3B. Display of a figure with seven segments is effected by means of seven segments a, b, c, d, e, f and g surrounded by solid lines and dotted lines in FIG. 3A. In this figure, a solid line represents a gap space of 50 microns in width between adjacent electrodes, where the transparent electrode layer is removed. As shown in FIG. 3A, the electrode on the front electrode substrate consists of seven electrodes 3a, 3b, 3c, 3d, 3e, 3f and 3g. In the illustrated embodiment, since the hatched regions surrounded respectively by the segment regions a, b, g and f and by the segment regions c, d, e and g are included in the central electrode 3g, there is no electrode which does not include a segment region.

Figure 3B:
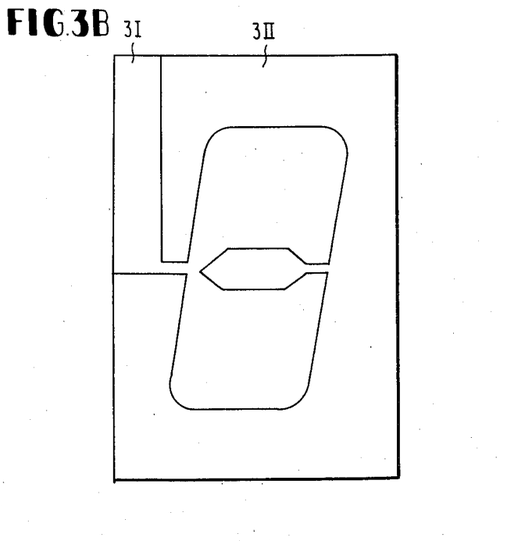
FIG. 3B is a plan view showing an electrode pattern on a back electrode substrate to be opposed to the electrode shown in FIG. 3A.

The electrode layer on the back electrode substrate is divided into two common electrodes 3I and 3II as shown in FIG. 3B. The first common electrode 3I is opposed to the six segment regions a, b, c, d, e and f as well as the region excluding the segment region g of the electrode 3g. The second common electrode 3II is opposed to the segment region g as well as the regions excluding the segment regions a, b, c, d, e and f of the electrodes 3a, 3b, 3c, 3d, 3e and 3f, respectively. Therefore, in the electrode substrates according to the illustrated embodiment, the number of electrodes can be reduced to nine. Moreover, since the inside background regions in the heretofore known electrode patterns are included in the electrode 3g, the lead regions for the inside background regions become unnecessary, and hence the etching treatment can be effected easily. In addition, since the gap spaces between the segment regions a and f and between the segment regions d and e can be narrowed, the quality of display is improved. Furthermore, there is provided an additional advantage that the number of channels in the driver circuit for driving the liquid crystal display panel according to the aforementioned embodiment can be reduced to 9 in total.

While description has been made above in connection with display of one digit in the abovementioned embodiment, in order to display n digits, it is only necessary to deem the electrode pattern on the front electrode substrate illustrated in FIG. 3A as one of the n digits and to divide the electrodes for all the n digits in a similar manner. With regard to the electrodes on the back electrode substrate, it is only necessary to commonly connect the electrodes 3I and 3II, respectively, of all the digits, and accordingly, the electrode on the back electrode substrate will still have the bisected electrode pattern even if the number of digits is increased. Thus the number of channels in the driver circuit for driving a n-digit display panel is equal to (7n+2).

As will be seen from the above-described embodiment, the number of electrodes on one side substrate is divided into the same number of sections as the number of segments, and each of the electrodes contributes to produce both a unit display area and a background area. The electrode on the other side substrate is divided into two sections, and each electrode includes one or more segment regions. Thus it is one of the distinctions of the electrode pattern according to the present invention from the heretofore known electrode pattern that every electrode always includes at least one segment region.

Figure 4A:
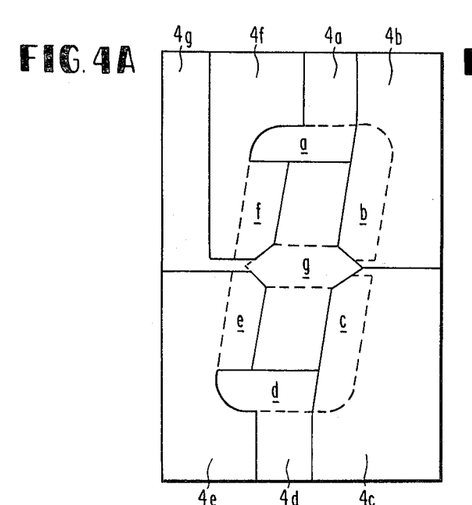
FIG. 4A is a plan view showing an electrode pattern on a front electrode substrate of a display panel according to a second preferred embodiment of the present invention.
Figure 4B:
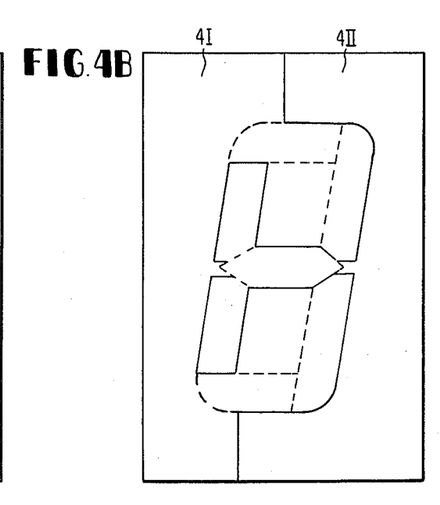
FIG. 4B is a plan view showing an electrode pattern on a back electrode substrate to be opposed to the electrode shown in FIG. 4A, FIGS. 5A through 5H are signal waveform diagrams to be used for explaining a first preferred embodiment of a driving method according to the present invention.

While one example of the electrode pattern is illustrated in FIGS. 3A and 3B, as a matter of course other modified electrode patterns can be conceived. For instance, the electrodes 3a, 3d, 3e and 3f in FIG. 3A could be slightly modified as shown at 4a, 4d, 4e and 4f in FIG. 4A. As a electrode pattern to be opposed to the electrode pattern shown in FIG. 4A, though the electrode pattern illustrated in FIG. 3B could be equally utilized, a modified electrode pattern consisting of common electrodes 4I and 4II as shown in FIG. 4B can be employed.

As will be obvious from these electrode patterns, the respective segment regions can be always defined by means of the outlines of opposed electrodes. In other words, the electrode patterns on the respective electrode substrates are determined in such manner that the etching lines for the front electrodes may overlap with a part of the outlines of the segment regions and the remaining part of the outlines may overlap with the etching lines for the back electrodes. Therefore, one of the features of the electrode pattern according to the present invention is that each electrode always includes a segment region and only a part of a segment region coincides with an etching line. Another feature of the present electrode pattern is that the substrate electrode on one side is divided into the same number of sections as the number of the segment regions, while the substrate electrode on the opposite side is divided into two sections.

While the construction of the liquid crystal display panel according to the present invention has been described above in connection to its preferred embodiment, now the method for driving such liquid crystals display panels according to the present invention will be generally explained, by way of example, with respect to the case where the liquid crystal display panel illustrates in FIGS. 3A and 3B are to be driven.

An electric signal S1 is applied to the first common electrode 3I and another electric signal S2 is applied to the other common electrode 3II. It is assumed that the signal S1 and the signal S2 are not identical. When the segment g is selected for display, the same signal S2 as that applied to the electrode 3II including the segment g is applied to the electrode 3g. When the segment g is not selected for display, an electric signal S3 that is different from the signals S1 and S2 is applied to the electrode 3g. In the case of applying such signals, a voltage determined by the signal applied to the electrode 3II and the signal applied to the electrode 3g is applied across the liquid crystal portion in the segment g, but upon selection for display no voltage is applied across the liquid crystal portion because the same signal S2 is applied to both electrodes, and hence the liquid crystal portion in the segment g is colored. On the other hand, if not selected for display, a voltage waveform G derived from the difference between the distinct signals S2 and S3 is applied across the liquid crystal portion in the segment g, and if the effective voltage of this voltage waveform G is selected higher than a threshold voltage value, then the liquid crystal portion in the segment g is decolored as explained previously with reference to FIG. 2.

The region where the electrode 3I and the electrode 3g are opposed to each other is a lead section for the segment g, and across the liquid crystal portion in this lead section is applied a voltage waveform GL1 derived from the difference between the signal S1 and the signal S2 or a voltage waveform GL2 derived from the difference between the signal S1 and the signal S3. If the effective voltages of these voltage waveforms GL1 and GL2 are selected higher than a threshold voltage value, then the liquid crystal portion in the lead section in decolored.

When the segments a, b, c, d, e and f are selected for display, the signal S1 is applied to the electrode 3a, 3b, 3c, 3d, 3e and 3f, respectively. When one of those segments is not selected for display, a electric signal S4 is applied to the electrode including the unselected segment region. The signal S4 is different from the signals S1 and S2. In the case of applying such signals, individual voltages determined by the signal applied to the electrode 3I and the signals applied to the electrodes 3a, 3b, 3c, 3d, 3e and 3f, respectively, are applied across the respective liquid crystal portions in the segments a, b, c, d, e and f is selected for display, since the same signal S1 is applied to the electrodes on the opposite sides of the liquid crystal portion in that segment, no voltage is applied across that liquid crystal portion, and hence it is colored. On the other hand, when the given segment is unselected for display, a voltage waveform H derived from the difference between the distinct signals S1 and S4 is applied across the liquid crystal portion in that given segment, and if the effective voltage of this voltage waveform H is selected higher than a threshold voltage value, then the liquid crystal portion in that given segment is decolored due to the operation principle as explained previously with reference to FIG. 2.

The regions where the electrode 3II and the electrodes 3a, 3b, 3c, 3d, 3e and 3f are opposed to each other are lead sections for the segments a, b, c, d, e and f, respectively, and a voltage wavefore HL1 deriving from the difference between the signal S2 and the signal S1 or a voltage waveform HL2 deriving from the difference between the signal S2 and the signal S3 is applied across the liquid crystal portions in these lead sections. If the effective voltages of these waveforms HL1 and HL2 are selected higher than a threshold voltage value, then the liquid crystal portions in these lead sections are decolored.

While the method for driving a liquid crystal display panel according to the present invention has been generally described above, it will be now obvious that according to this method only the segments selected for display are colored and the other segments as well as the background are decolored. In addition, it is to be noted that since the lead sections for the respective segments serve as a background, a positive display in which the background is white and only the displayed segments are colored, can be realized. The signals to be applied to the respective electrodes in the case of displaying numerals 0 to 9, respectively, are shown in Table 1 below.

TABLE 1

| Numeral to be displayed | Electrode | | | | | | | | |
|---|---|---|---|---|---|---|---|---|---|
| | 3I | 3II | 3a | 3b | 3c | 3d | 3e | 3f | 3g |
| 0 | S1 | S2 | S1 | S1 | S1 | S1 | S1 | S1 | S3 |
| 1 | S1 | S2 | S4 | S1 | S1 | S4 | S4 | S4 | S3 |
| 2 | S1 | S2 | S1 | S1 | S4 | S1 | S1 | S4 | S2 |
| 3 | S1 | S2 | S1 | S1 | S1 | S1 | S4 | S4 | S2 |
| 4 | S1 | S2 | S4 | S1 | S1 | S4 | S4 | S1 | S2 |
| 5 | S1 | S2 | S1 | S4 | S1 | S1 | S4 | S1 | S2 |
| 6 | S1 | S2 | S1 | S4 | S1 | S1 | S1 | S1 | S2 |
| 7 | S1 | S2 | S1 | S1 | S1 | S4 | S4 | S1 | S3 |
| 8 | S1 | S2 | S1 | S1 | S1 | S1 | S1 | S1 | S2 |
| 9 | S1 | S2 | S1 | S1 | S1 | S1 | S4 | S1 | S2 |

Now a first preferred embodiment of the driving method according to the present invention, in which the employed electric signals S1, S2, S3 and S4 are rectangular wave signals having the same frequency, the same crest value and the same duty, but being different only in phase, will be described rather generally.

As the electric signals S1, S2, S3 and S4, D.C. rectangular wave signals having a frequency f, a crest value $V_1$ and a duty of $\frac{1}{2}$ are employed, the signal S2 being phase-shifted by $\theta_1(-\pi<\theta_1<\pi, \theta_1\neq 0)$ with respect to the signal S1, the signal S3 being phase-shifted by $\theta_2(-\pi<\theta_2<\pi, \theta_2\neq 0, \theta_1)$ with respect to the signal S1, and the signal S4 is phase-shifted by $\theta_3(-\pi<\theta_3<\pi, \theta_3\neq 0, \theta_1)$ with respect to the signal S1.

In the following, description will be made on the voltage waveforms G and H applied across the liquid crystal portions in the segments and the voltage wave forms GL and HL applied across the liquid crystal portions in the lead sections for the segments in response to these four kinds of signals upon non-selection for display of the corresponding segments. The voltage waveform G derived from the difference between the signal S2 and the signal S3 as described previously, and hence, it is an A.C. rectangular waveform having a duty of $\{2\pi-|\theta_1-\theta_2|\}/\pi$, a crest value $V_1$ and a frequency f in the case of $|\theta_1-\theta_2|\geq\pi$, while it is an A.C. rectangular waveform having a duty of $|\theta_1-\theta_2|/\pi$, a crest value $V_1$ and a frequency f in the case of $|\theta_1-\theta_2|\leq\pi$. The voltage waveform GL1 is an A.C. rectangular waveform having a duty of $|\theta_1|/\pi$, a crest value $V_1$ and a frequency f, which derived from the difference between the signal S1 and the signal S2. On the other hand the voltage waveform GL2 is an A.C. rectangular waveform having a duty of waveform having a duty of $|\theta_2|/\pi$, a crest value $V_1$ and a frequency f, which consists of the difference between the signal S1 and the signal S3. The voltage waveform H is an A.C. rectangular waveform having a duty of $|\theta_2|/\pi$, a crest value $V_1$ and a frequency f, which consists of the difference between the signal S1 and the signal S4. The voltage waveform HL1 is an A.C. rectangular waveform having a duty of $|\theta_1|/\pi$, a crest value $V_1$ and a frequency f, which derived from the difference between the signal S2 and the signal S1. In addition, the voltage waveform HL2 derived from the difference between the signal S2 and the signal S4, and hence, it is an A.C. rectangular waveform having a duty of $\{2\pi-|\theta_1-\theta_3|\}/\pi$, a crest value $V_1$ and a frequency f in the case of $|\theta_1-\theta_3|\geq\pi$, while it is an A.C. rectangular waveform having a duty of $|\theta_1-\theta_3|/\pi$, a crest value $V_1$ and a frequency f in the case of $|\theta_1-\theta_3|\leq\pi$. An effective voltage of an A.C. rectangular waveform having a duty of $|\theta|/\pi$, a crest value $V_1$ and a frequency f is represented by a formula of $\sqrt{|\theta|/\pi}\cdot V_1$, and so, the phase differences $\theta_1$, $\theta_2$ and $\theta_3$ among the signals S1, S2, S3 and S4 as well as the crest value $V_1$ are determined so that the effective voltages of the voltage waveforms G, H, GL1, GL2, HL1 and HL2 may become higher than the threshold voltage value. It is to be noted that the phase differences $\theta_2$ and $\theta_3$ could be made identical without any objection.

With regard to the above-described first preferred embodiment, two practical examples assuming certain numerical values will be described hereunder with reference to waveform diagrams in FIGS. 5A to 5H and FIGS. 6A to 6K.

Figure 5:
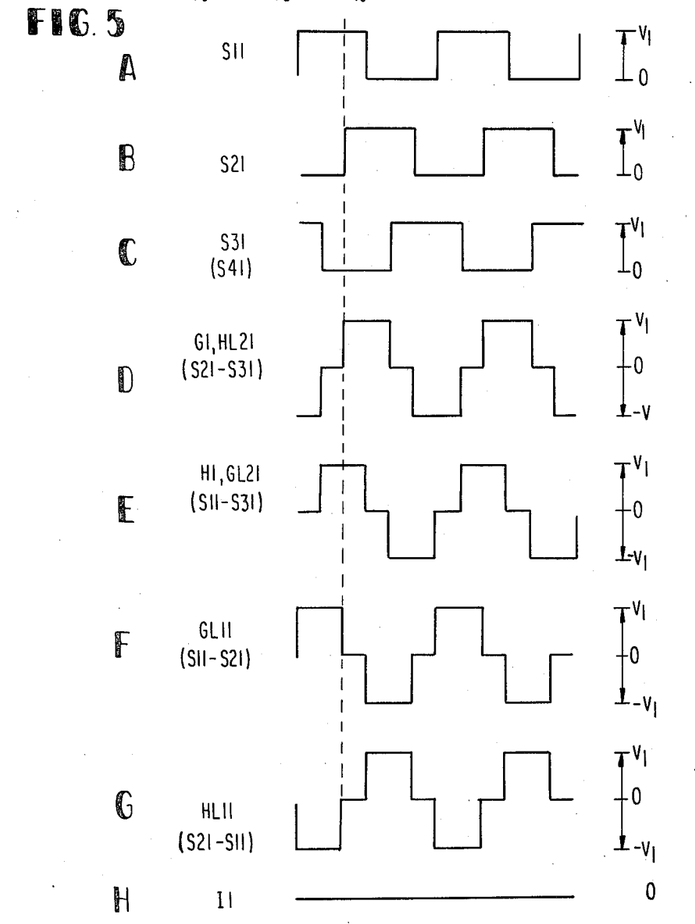

In a first example, voltage waveforms S11, S21 and S31 shown in FIGS. 5A to 5C are applied to the respective electrodes. It is to be noted that in this first example all the symbols S1, S2, S3, S4, G, H, GL1, GL2, HL1 and HL2 used in the general description are represented with addition of another suffix "1" in the form of S11, S21, S31, S41, G1, H1, GL11, GL21, HL11 and HL21. The electric signal S11 (FIG. 5A) is a D.C. rectangular wave having a frequency of 100 Hz, a duty of ½ and a crest value $V_1$, the electric signal S21 (FIG. 5B) is lagged in phase of ⅔π with respect to the signal S11, and the electric signal S31 (FIG. 5C) is advanced in phase by ⅔π with respect to the signal S11. It is to be noted that in this example the electric signal S41 is assumed to be identical to the signal S31 as shown in FIG. 5C.

The voltage waveforms G1, H1, GL11, GL21, HL11 and HL21 applied across the liquid crystal portions in the respective segments and in the respective lead sections in response to these three kinds of electric signals, are shown in FIGS. 5D to 5H taking the side of the electrode 3I or 3II as a positive pole of the polarity. The waveform I1 shown in FIG. 5H indicates that the voltage applied across the liquid crystal portion in a given segment when it is selected for display, is constantly equal to zero. The waveform G1 shown in FIG. 5D represents the voltage applied across the liquid crystal portion in the segment g when it is unselected for display, and this voltage waveform G1 results from the difference (S21-S31) between the signals S21 and S31. The waveform H1 shown in FIG. 5E represents the voltage applied across the liquid crystal portion in the segment a, b, c, d, e or f when they are not selected for display, and this voltage waveform H1 results from the difference (S11-S31) between the signals S11 and S31. The waveform GL11 in FIG. 5F and the waveform GL21 in FIG. 5E represent the voltages applied across the liquid crystal portion in the lead section for the segment g when the segment g is selected for display and when the segment g is not selected for display, respectively, and these voltage waveforms GL11 and GL21 result from the difference (S11-S21) between the signals S11 and S21 and from the difference (S11-S31) between the signal S11 and S31, respectively. The waveform HL11 in FIG. 5G and the waveform HL21 in FIG. 5D represent the voltages applied across the liquid crystal portion in the lead section for the segment a, b, c, d, e or f when the corresponding segment is selected for display and when the corresponding segment is not selected for display, respectively, and these voltage waveforms HL11 and HL21 result from the difference (S21-S11) between the signals S21 and S11 and from the difference (S21-S31) between the signals S21 and S31. As will be seen from the voltage waveforms shown in FIGS. 5D to 5G, A.C. rectangular waves having a duty of ⅔ and a crest value $V_1$ are applied across the liquid crystal portions in the regions except for the selected segment or segments, and hence, the crest value $V_1$ is selected so that the effective voltage value $\sqrt{⅔}\cdot V_1$ of those rectangular waves may exceed the threshold voltage value of the liquid crystal display panel.

In a second example of the first preferred embodiment of the driving method according to the present invention, voltage waveforms S12, S22, S32 and S42 shown in FIGS. 6A to 6D are applied to the respective electrodes. It is to be noted that in this second example all the symbols used S1, S2, S3, S4, G, H, GL1, GL2, HL1 and HL2 used in the general description are represented with addition of another suffix "2" in the form of S12, S22, S32, S42, G2, H2, GL12, GL22, HL12 and HL22. The electric signal S12 (FIG. 6A) is a D.C. rectangular wave having a frequency of 100 Hz, a duty of ½ and a crest value $V_1$, the electric signal S22 (FIG. 6B) lags in phase by $\pi/2$ with respect to the signal S12 ($\theta_1=-\pi/2$), the electric signal S32 (FIG. 6C) is opposite in phase with respect to the signal S22 ($\theta_2=\pi/2$), and the electric signal S42 (FIG. 6D) is opposite in phase with respect to the signal S12 ($\theta_3=\pi$).

Figure 6:
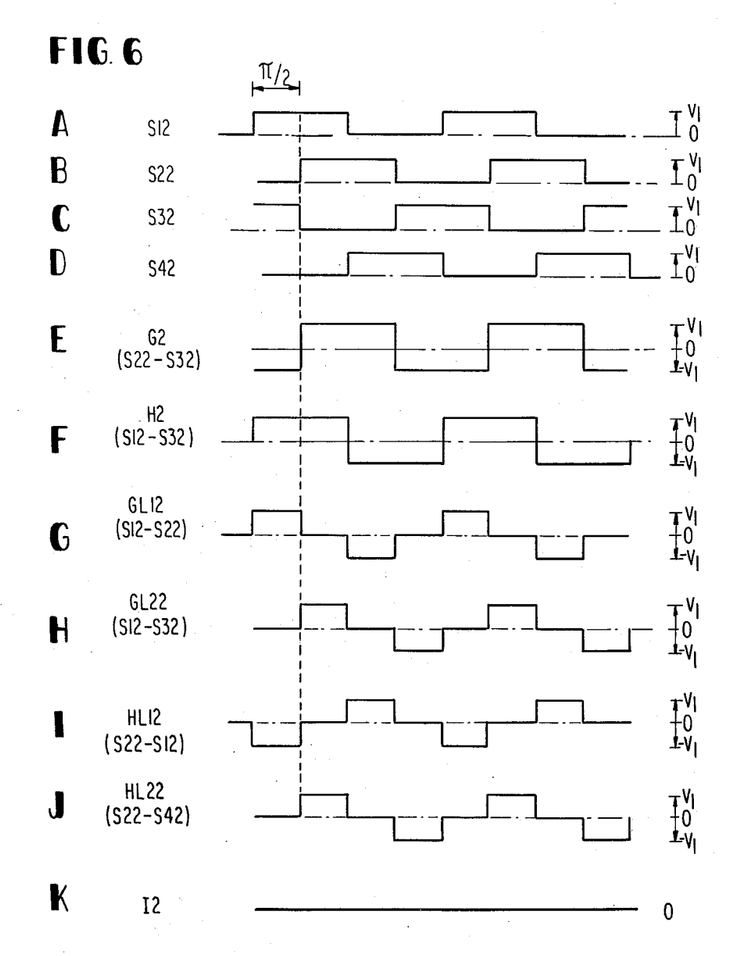
FIGS. 6A through 6K are signal waveform diagrams to be used for explaining a second preferred embodiment of a driving method according to the present invention.

The waveforms G2, H2, GL12, GL22, HL12 and HL22 applied across the liquid crystal portions in the respective segments and in the respective lead sections in response to these four kinds of electric signals are shown in FIGS. 6E to 6J taking the side of the severed electrode 3I or 3II as a positive pole of the polarity. The waveform I2 shown in FIG. 6K indicates that the voltage applied across the liquid crystal portion in a given segment when it is selected for display, is constantly equal to zero. The waveform G2 shown in FIG. 6E represents the voltage applied across the liquid crystal portion in the segment g when it is unselected for display, and this voltage waveform G2 results from the difference (S22-S32) between the signals S22 and S32. The waveform H2 shown in FIG. 6F represents the voltage applied across the liquid crystal portions in the segments a, b, c, d, e or f when they are not selected for display, and this voltage waveform H2 results from the difference (S12-S42) between the signals S12 and S42.

The waveform GL12 in FIG. 6G and the waveform GL22 in FIG. 6H represent the voltages applied across the liquid crystal portion in the lead section for the segment g when the segment g is selected for display and when the segment g is not selected for display, respectively, and these voltage waveforms GL12 and GL22 result from the difference (S12−S22) between the signals S12 and S22 and from the difference (S12−S32) between the signals S12 and S32, respectively. The waveform HL12 in FIG. 6I and the waveform HL22 in FIG. 6J represent the voltages applied across the liquid crystal portions in the lead sections for the segments a, b, c, d, e or f when the corresponding segment is selected for display and when the corresponding segment is not selected for display, respectively, and these voltage waveforms HL12 and HL22 result from the difference (S22−S12) between the signals S22 and S12 and from the difference (S22−S42) between the signals S22 and S42, respectively. As will be seen from the voltage waveforms shown in FIGS. 6G to 6J, A.C. rectangular waves having a duty of ½ and a crest value $V_1$ are applied across the liquid crystal portions in the lead sections for the respective segments. The effective voltage of such A.C. rectangular waves is equal to $V_1/\sqrt{2}$, and hence, in order to achieve the desired positive display it is only necessary to select this value equal to or higher than the threshold voltage of the liquid crystal display panel. Since the liquid crystal portions in the lead sections are always applied with a voltage, the decoloring of these lead sections are irrelevant to the response time of the liquid crystal display panel, and accordingly the effective voltage $V_1/\sqrt{2}$ could be selected equal to the threshold voltage. On the other hand, upon non-selection for display the liquid crystal portions in the segments a, b, c, d, e or f are applied with an A.C. rectangular wave having a duty of one and a crest value $V_1$, and hence the non-selected segment is decolored, because the effect voltage of this A.C. rectangular wave is equal to $V_1$ which is then higher than the threshold voltage.

Two practical examples for the first preferred embodiment have been described above, and in the first practical example an effective voltage of $\sqrt{\frac{2}{3}} V_1$ is applied across the liquid crystal portions in the lead sections and in the segments not to be displayed, but in the second practical example an effective voltage of $V_1/\sqrt{2}$ is applied across the liquid crystal portions in the lead sections, while an effective voltage of $V_1$ is applied across the liquid crystal portion in the segments not to be displayed. Relative to a threshold voltage Vth of a liquid crystal display panel, the crest value $V_1$ of the applied electric signals must fulfill the relation $V_1 \geq \sqrt{3/2}$ Vth in the first practical example, whereas it must fulfil the relation $V_1 \geq \sqrt{2}$ Vth in the second practical example, and in view of these relations in the driving method of the first practical example a liquid crystal display panel can be driven with a lower voltage than in the driving method of the second practical example. However, in the case where the responsive time is taken into consideration, since the voltage applied across the liquid crystal portion in the segment not to be displayed is higher in the driving method of the second practical example, with regard to the response characteristics the driving method of the second practical example is preferred. Therefore, either of these two driving methods could be selected depending upon the object of use.

Now a second preferred embodiment of the driving method according to the present invention, in which the employed electric signals S1, S2, S3 and S4 are rectangular wave signals and among these signals at least the signals S1 and S2 have frequencies different by a factor of an integer, will be described in detail with reference to FIGS. 7A to 7K. It is to be noted that in this second preferred embodiment, all the symbols S1, S2, S3, S4, G, H, GL1, GL2, HL1 and HL2 used previously in the general description of the driving method are represented with addition of another suffix "3" in the form of S13, S23, S33, S43, G3, H3, GL13, GL23, HL13 and HL23.

Figure 7:
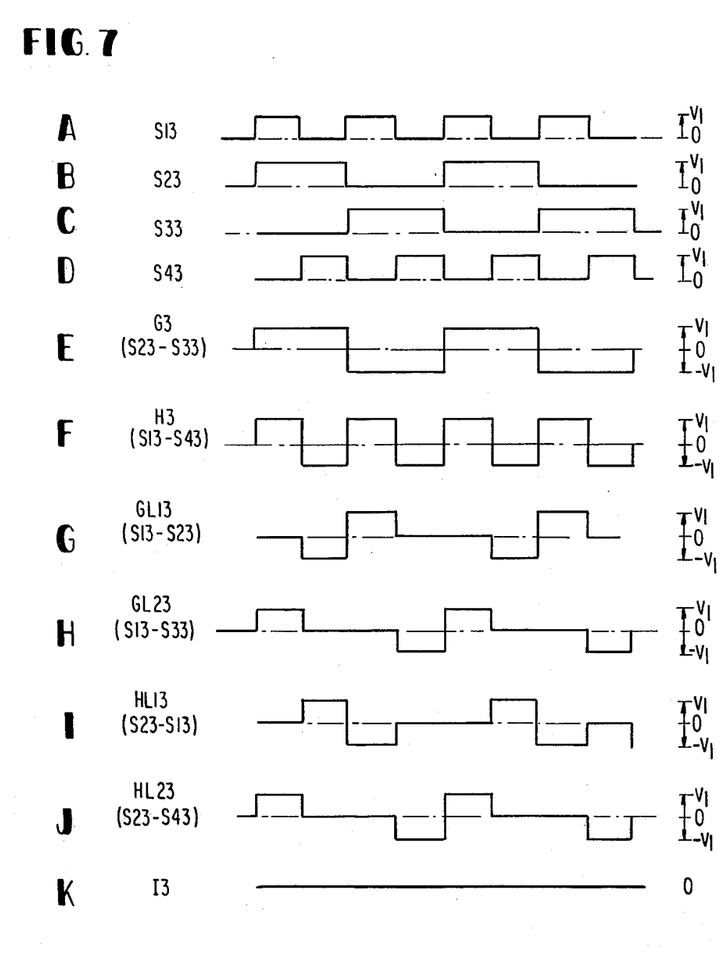
FIGS. 7A through 7K are signal waveform diagrams to be used for explaining a third preferred embodiment of a driving method according to the present invention.

The electric signal S13 shown in FIG. 7A is a D.C. rectangular wave having a duty of ½, a crest value $V_1$ and a frequency $f_1$ of 200 Hz, but the electric signal S23 shown in FIG. 7B is a D.C. rectangular wave having a duty of ½, a crest value $V_1$ and a frequency $f_2$ of ½ the frequency $f_1$, i.e., of 100 Hz. The electric signal S33 shown in FIG. 7C and the electric signal S43 shown in FIG. 7D are in an opposite phase relation to the signals S23 and S13, respectively.

The voltage waveforms G3, H3, GL13, GL23, HL13 and HL23 applied across the liquid crystal portions in the respective segments and in the respective lead sections in response to these four kinds of electric signals are shown in FIGS. 7E to 7J taking the side of the severed electrode 3I or 3II as a positive pole of the polarity. The waveform I3 shown in FIG. 7K indicates that the voltage applied across the liquid crystal portion in a given segment when it is selected for display, is constantly equal to zero. The waveform G3 shown in FIG. 7E represents the voltage applied across the liquid crystal portion in the segment g when it is not selected for display, and this voltage waveform G3 results from the difference (S23−S33) between the signals S23 and S33. The waveform H3 shown in FIG. 7F represents the voltage applied across the liquid crystal portions in the segments a, b, c, d, e or f when they are not selected for display, and this voltage waveform H3 results from the difference (S13−S43) between the signals S13 and S43. The waveform GL13 shown in FIG. 7G and the waveform GL23 shown in FIG. 7H represent the voltages applied across the liquid crystal portion in the lead section for the segment g when the segment g is selected for display and when the segment g is not selected for display, respectively, and these voltage waveforms GL13 and GL23 result from the difference (S13−S23) between the signals S13 and S23 and from the difference (S13−S33) between the signals S13 and S33, respectively. In addition, the waveform HL13 shown in FIG. 7I and the waveform HL23 shown in FIG. 7J represent the voltages applied across the liquid crystal portions in the lead sections for the segments a, b, c, d, e or f when the corresponding segment is selected for display and when the corresponding segment is not selected for display, respectively, and these voltage waveforms HL13 and HL23 result from the difference (S23−S13) between the signals S23 and S13 and from the difference (S23−S43) between the signals S23 and S43, respectively. As will be seen from the voltage waveforms shown in FIGS. 7G to 7J, the liquid crystal portions in the lead sections for the respective segments are energized by applying A.C. rectangular waves having a duty of ½ and a crest value of $V_1$, and the effective voltage of such A.C. rectangular waves is equal to $V_1/\sqrt{2}$. Therefore, similarly to the first preferred embodiment (the second example) illustrated in FIGS. 6A to 6K, in order to achieve the desired positive display it is only necessary to select the crest value $V_1$ so as to fulfill the relation $V_1 \geq \sqrt{2}$ Vth, where Vth represents the threshold voltage of the liquid crystal display panel.

Now, a construction of practical electrode patterns of a liquid crystal display panel according to the present invention as applied to a clock display panel and one example of a driving circuit for that display panel will be described with reference to FIGS. 8A, 8B and 9.

Figure 8A:
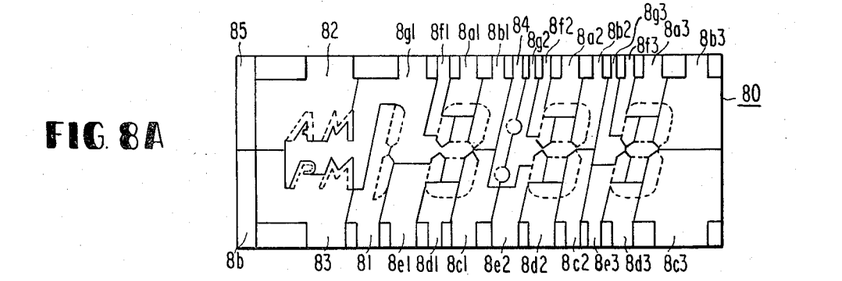
FIG. 8A is a plan view showing an electrode pattern on a front electrode substrate of a third preferred embodiment of the present invention in which the principle of the present invention is applied to a clock display panel.
Figure 8B:
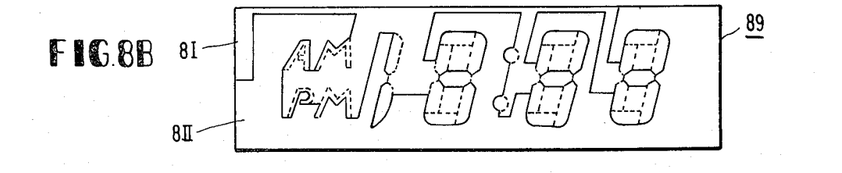
FIG. 8B is a plan view showing an electrode pattern on a back electrode substrate to be opposed to the electrode shown in FIG. 8A.

A front electrode layer shown in FIG. 8A is divided into 27 sections 8a1 to 8g1, 8a2 to 8g2, 8a3 to 8g3 and 81 to 86, and a back electrode layer shown in FIG. 8B is divided into two sections 8I and 8II. For the purpose of displaying the unit digit of the hour and the tens and unit digits of the minutes, there are provided three sets of front electrode patterns similar to that shown in FIG. 3A, in which the respective electrodes including the respective segments a to g of the three digits are designated by the reference symbols 8a1 to 8g1, 8a2 to 8g2 and 8a3 to 8g2, respectively. In addition, an additional electrode 81 including a segment for digit "1" that is necessary for displaying ten, eleven or twelve o'clock is disposed adjacent to the electrodes 8e1 and 8g1. Furthermore, electrodes 82 and 83 including segment regions for displaying "AM" and "PM", respectively, are disposed on the left side of the electrode 81. As will be apparent from FIG. 8A, a part of the electrode 8g1 also serves as a part of the background for the "AM" and "PM" display. An additional electrode 84 including a segment region for displaying a colon (:) is disposed between the digits representing "o'clock" and the digits representing "minutes" so as to be surrounded by the electrodes 8b1, 8c1 and 8g2. Moreover, at the left end of a front electrode substrate 80 are provided terminal electrodes 85 and 86 to be connected to the back electrodes 8I and 8II, respectively.

An electrode layer on a back electrode substrate 89 opposed to the above-mentioned front electrode substrate 80, is divided into two sections 8I and 8II as shown in FIG. 8B. More particularly, the portion of the back electrode opposed to the figure eight segment array has an electrode pattern similar to that shown in FIG. 3B. The corresponding electrodes in the respective sets of electrodes are connected in common to form two common electrode 8I and 8II. That is, the electrode 8I is one common electrode including all the segments regions except for the segments g of the three digits and having an outline opposed to the segment boundary line portions depicted by dotted lines in FIG. 8A. On the other hand, the electrode 8II is the other common electrode including the segment regions g of the these digits.

Figure 9:
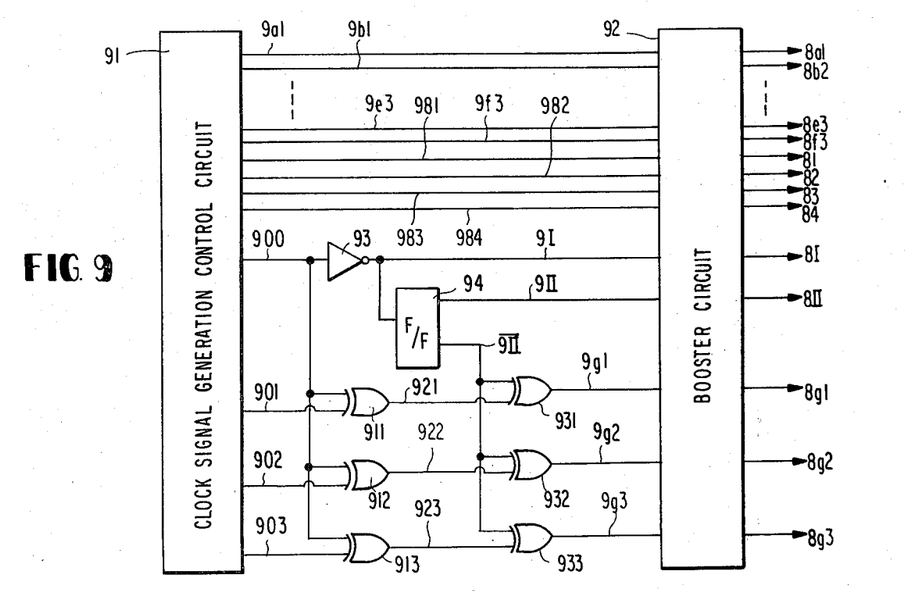
FIG. 9 is a circuit diagram showing one example of a driving circuit to be used for driving the display panel shown in FIGS. 8A and 8B.

One example of a driving circuit to be used in the case of driving the above-described clock display panel through the driving method illustrated in FIGS. 7A to 7K, is illustrated in FIG. 9.

In order to apply desired driving voltages to all the electrodes, at first signal waveforms corresponding to the respective driving voltage waveforms are generated in a logic section illustrated to the left of a block 92 in FIG. 9. The signal waveforms on 27 signal lines in total derived from the logic section are input to a booster circuit 92, in which the respective signal waves are boosted up to a voltage higher than the threshold voltage of the display panel, and thereby the desired driving voltages are respectively applied to the corresponding electrodes. Among the 27 signal lines, 18 signal lines 9a1 to 9f3 corresponding to the electrodes 8a1 to 8f1, 8a2 to 8f2 and 8a3 to 8f3 and 4 signal lines 981 to 984 corresponding to the electrodes 81, 82, 83 and 84 are connected directly from output terminals of a clock signal generation control circuit 91 within the logic section to input terminals of the booster circuit 92.

On the other hand, the signal waveforms corresponding to the electrodes 8I, 8II, 8g1, 8g2 and 8g3 are input to the booster circuit 92 via the remaining 5 signal lines 9I, 9II, 9g1, 9g2 and 9g3, and these signal lines are connected to the clock signal generation control circuit 91 through a particular network as described in the following. A first clock signal generated by the control circuit 91 is derived through a signal line 900 and is branched so that one branch is connected to an input of an inverter circuit 93 and the other branch is connected as one input to each of the exclusive-OR circuits 911, 912 and 913, the other inputs of which are connected to second, third and fourth clock signal lines 901, 902 and 903, respectively. The output of the inverter circuit 93 is branched, one branch being connected to the signal line 9I, and the other branch being connected to an input of a flip-flop circuit 94. A normal output of the flip-flop circuit 94 is connected to the signal line 9II, and an inverted output of the flip-flop circuit 94 is connected to one input of each of the exclusive-OR circuits 931, 932 and 933, the other inputs of which are connected to output lines 921, 922 and 923, respectively, from the exclusive-OR circuits 911, 912 and 913. Then the outputs of the exclusive-OR circuits 931, 932 and 933 are respectively connected to the signal lines 9g1, 9g2 and 9g3.

Now a description will be made of the case where the driving voltage waveforms S13, S23, S33 and S43 shown in FIGS. 7A to 7D are generated by means of the circuit construction illustrated in FIG. 9. The clock signals to be applied to the 22 signal lines 9a1 to 9f3, 81, 82, 83 and 84 are a clock waveform synchronized with the signal S13 shown in FIG. 7A when the segments included in the electrodes corresponding to the respective signal lines are to be displayed, but they are a clock waveform sychronized with the signal S43 shown in FIG. 7D when the segments included in the electrodes corresponding to the respective signal lines are not to be displayed. A clock signal synchronized with the signal S43 shown in FIG. 7D appears on the signal line 900. Accordingly, a signal waveform synchronized with the signal S33 shown in FIG. 7C appears on the inverted output line 9II of the flip-flop circuit 94, which is an inverted waveform for the signal S23. On the clock signal lines 901, 902 and 903, clock pulses synchronized with the signal S13 shown in FIG. 7A are derived when the segments g included in the electrodes 8g1, 8g2 and 8g3 are to be displayed, but clock pulses synchronized with the signal S43 shown in FIG. 7D are derived when the segments g are not to be displayed. Accordingly, when the segments g are to be displayed, a signal waveform synchronized with the signal S23 shown in FIG. 7B is derived on the signal lines 9g1, 9g2 and 9g3 via the two stages of exclusive-OR circuits 911–913 and 931–933. However, when the segments g are not to be displayed, a signal waveform synchronized with the signal S33 shown in FIG. 7C is derived on the signal lines 9g1, 9g2 and 9g3.

In one practical example of the above-described driving circuit, for the clock pulse generation control circuit 91, C-MOS LSI (Complementary Metal Oxide Semiconductor for Large Scale Integrated Circuit) Model-μPD 844G sold for use in a digital watch by the assignee of this application (NEC) is used. Likewise, Model-μPD 4069C made by NEC could be used for the inverter 93, Model-μPD 4027C made by NEC could be used for the flip-flop circuit 94, and Model-μPD 4030C made by NEC could be used for the exclusive-OR circuits. For the booster circuit 92, Model-CD40109B made by RCA (for Radio Corporation of America) could be used for boosting up the signal voltage to 15 V. The threshold voltage Vth when a liquid crystal prepared by mixing E8 (biphenyl liquid crystal produced by British Drug House in Britain) and cholesteryl chloride (C.C.) in the proportion of 9:1 is used as the liquid crystal medium in the display panel, is 7.5 V if the gap distance in the liquid crystal panel is 12 microns. Since the crest value $V_1$ of the driving voltage is required to be equal to or higher than a $\sqrt{2}$-fold of the threshold voltage Vth of the liquid crystal display panel as described previously, the boosting up to 15 V is sufficient for driving the liquid crystal clock display panel.

Figures 10A, 10B, 10C:
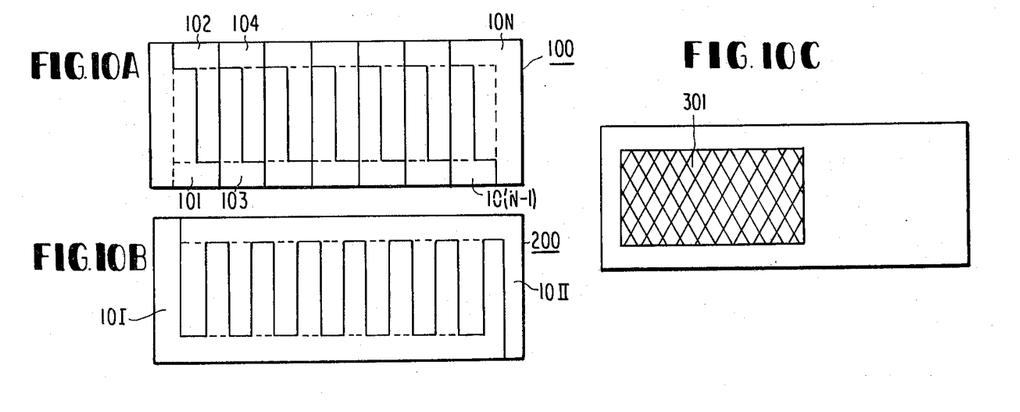
FIG. 10A is a plan view showing an electrode pattern on a front electrode substrate of another preferred embodiment of the present invention in which the principle of the present invention is applied to a bar graph display panel.
FIG. 10B is a plan view showing an electrode pattern on a back electrode substrate to be opposed to the electrode shown in FIG. 10A.
FIG. 10C is a plan view illustrating one example of display on the bar graph display panel shown in FIGS. 10A and 10B.

While the description has been made above in connection with the display of a digit by means of a figure eight segment array, the invention is not limited to display of digits, but display of any desired character can be achieved according to the present invention as illustrated in FIGS. 8A and 8B. Moreover, a bar graph display can be also achieved according to the present invention as illustrated in FIGS. 10A, 10B and 10C. Now the bar graph display panel will be explained briefly with reference to FIGS. 10A, 10B and 10C.

As shown in FIG. 10A, on a front electrode substrate 100 a bar display region is divided into N bar segments, and a front electrode layer is also divided into N electrodes 101 to 10N in such manner that a part of the outlines of the respective electrodes including the different segment regions may coincide with a part of the outlines of the corresponding segment regions. On a back electrode substrate 200 opposed to the front electrode substrate 100, the electrode layer is divided into two sections in such manner that one common electrode 10I may include alternate bar segment regions and a part of its outline may coincide with a part of the outlines of the bar segment regions indicated by dotted lines in FIG. 10A. The other common electrode 10II occupies the remaining region of the back electrode substrate 200. One example of a driven bar graph display is illustrated in FIG. 10C with cross-hatched area 301. The display area 301 is obtained in the same manner explained in a charactor display.

While the present invention has been described above in connection to its preferred embodiment, obviously the invention should not be limited to only such embodiments. For instance, through the back electrode substrate was formed in a bisected construction in the illustrated embodiments, it is apparent that the present invention is not degraded even if the back electrode substrate is severed into the same number of sections as the number of the segments and the front electrode substrate is formed in a bisected construction. Moreover, the present invention is equally applicable to a display panel operated on the basis of a display principle other than the liquid crystal display. Although the guest-host type liquid crystal display panel as used in the illustrated embodiments is most effective, the present invention should not be limited to such type of display panels, but can be applied other type liquid crystal display panel using so called Dynamic Scattering type or Field Effect-Twisted Nematic type. Furthermore, provided that the display panel is of the type in which display is effected by applying an A.C. voltage between opposed electrodes such as, for example, electroluminescence display panels making use of the electroluminescence phenomena, the advantage of the present invention can be achieved effectively.

What is claimed is:

1. A display panel adapted to display information by the distinctive optical appearance of selected display segments against a background, comprising:
   a first substrate having a plurality of first electrodes disposed thereon, said first electrodes covering substantially the entire area of said first substrate except for first lines of narrow spaces which serve to electrically insulate said first electrodes from each other and which have dimensions small compared to dimensions of said segments, the number of said first electrodes being identical to the total number of said segments;
   a second substrate opposed to said first substrate having a pair of second electrodes disposed thereon, said second electrodes covering substantially the entire area of said second substrate except for a second line of narrow space which serves to electrically insulate said second electrodes from each other and which has a width small compared to dimensions of said segments;
   each of said first electrodes including a first lead area and a first segment area, each of said second electrodes including a second lead area and at least one second segment area, a part of a circumference of said first segment area coinciding with a part of said first lines and the remaining parts of said circumference of said first segment area coinciding with a part of said second line, the remaining part of said second line coinciding with the remaining part of said first lines, one of said second electrodes coinciding with both of at least one of said first lead areas of at least one predetermined first electrode and each said first segment area of the remaining of said first electrodes, and the other of said second electrodes coinciding with both of each said first lead areas of the remaining of said first electrodes and each said segment area of said at least one predetermined electrode; and
   a display medium interposed between said first substrate and said second substrate.

2. A display panel as claimed in claim 1 further comprising:
   means for applying different second electrode driving signals, respectively, to each of said pair of second electrodes; and
   means for applying to said first electrodes a first electrode driving signal, wherein, for ones of said first and second segment areas selected for display, ones of said first electrodes encompassing selected first segment areas receive a driving signal substantially identical to the second electrode driving signal applied to ones of said second electrodes encompassing selected second segment areas, and for ones of said first and second segment areas not selected for display, ones of said first electrodes encompassing said non-selected segment areas receive a driving signal different from all said second electrode driving signals.

3. A display panel as claimed in claim 2 wherein said display comprises a liquid crystal medium of a type which displays a color when subjected to a voltage field substantially at zero volts and is decolored in response to a voltage field above a threshold level.

4. A display panel as claimed in claim 1 wherein said segment areas include at least on figure-eight pattern of seven display segments, and wherein said first electrodes include seven lead areas encompassing respective ones of said seven segments, and said second electrodes collectively encompass all seven of said segments.

5. A display panel as claimed in claim 4 wherein one electrode of said pair of second electrodes encompasses a segment representing a central crossing segment of the figure eight, and the other electrode of said pair of second electrodes encompasses the remaining six segments.

6. A display apparatus adapted to display information by the distinctive optical appearance of selected display segments against a background, comprising:

a first substrate having a plurality of first electrodes disposed thereon, said first electrodes covering substantially the entire area of said first substrate except for first lines of narrow spaces which serve to electrically insulate said first electrodes from each other and which have a width small compared to dimensions of said segments, the number of said first electrodes being identical to the total number of said segments;

a second substrate opposed to said first substrate having a pair of second electrodes disposed thereon, said second electrodes covering substantially the entire area of said second substrate except for a second line of narrow space which serves to electrically insulate said second electrodes from each other which has dimensions small compared to dimensions of said segments;

each of said first electrodes including a first lead area and a first segment area, each of said second electrodes including a second lead area and at least one second segment area, a part of a circumference of said first segment area coinciding with a part of said first lines and the remaining part of said circumference of said first segment area coinciding with a part of said second line, the remaining part of said second line coinciding with the remaining part of said first lines, one of said second electrodes coinciding with both of at least one of said first areas of at least one predetermined first electrode and each side first segment area of the remaining of said first electrodes, and the other of said second electrodes coinciding with both of each said first lead area of the remaining of said first electrodes and each said first segment area of said at least one predetermine first electrode;

a display medium interposed between said first substrate and said second substrate;

means for applying a first driving signal to one of said second electrodes;

means for applying a second driving signal to the other of said second electrodes;

means for applying said first driving signal to a selected one of said first electrodes including a segment to be displayed coinciding with said second segment area of said one of said second electrodes;

means for applying said second driving signal to a selected one of said first electrodes including a segment to be displayed coinciding with said second segment area of said other of said second electrodes; and means for applying a third driving signal to the remaining of said first electrodes including a segment not to be displayed, said first, second and third driving signals being different from each other, whereby a dark symbol is displayed against a bright background and all of said lead areas become said bright background with no electrode contributing to only the background.

7. A display apparatus adapted to display information on a panel by the distinctive dark appearance of unit display areas selected from seven unit display areas arrayed in a figure-eight pattern against a bright background area on said panel, comprising:

a first electrode substrate having seven divided electrodes disposed thereon, said divided electrodes covering substantially the entire area of said first electrode substrate except for narrow separation lines which serve to electrically insulate said divided electrodes from each other, each of said divided electrodes on said first substrate having both a lead portion contributing to said background area and a display portion, said lead portion opposing a part of said background area, and said display portion opposing one of said unit display areas and having an outline section opposed to a part of boundary lines of said unit display areas;

a second electrode substrate opposed to said first electrode substrate and having a pair of common electrodes disposed thereon, said common electrodes covering substantially the entire area of said second electrode substrate except for narrow separation lines which serve to electrically insulate said common electrodes, and said common electrodes having both a lead portion and a display portion, said lead portion opposing a part of said background area, and said display portion opposing at least one of said unit display areas and having an outline section opposed to a remaining part of boundary lines of said unit display areas;

a display medium interposed between said first electrode substrate and said second electrode substrate, said display medium having a predetermined transition voltage;

first means for applying first unipolar addressing signals to selected divided electrodes on said first substrate and one of said common electrodes corresponding to selected unit display areas of a desired symbol, said first addressing signals each having substantially the same amplitude and frequency; and second means for applying second addressing signals to said divided electrodes on said first substrate and the other of said common electrodes corresponding to unselected unit display areas, said second addressing signals each having substantially the same amplitude and frequency and producing a potential difference in the display background larger than said predetermined transition voltage of said display medium.

* * * * *

UNITED STATES PATENT AND TRADEMARK OFFICE
CERTIFICATE OF CORRECTION

PATENT NO. : 4,386,350

DATED : May 31, 1983

INVENTOR(S) : Fumihiro OGAWA

It is certified that error appears in the above-identified patent and that said Letters Patent is hereby corrected as shown below:

Column 1, line 62 - change "die" to --dye--

Column 2, line 29 - change "patters" to --pattern--

Column 15, line 46 - change "charator" to --character--

Signed and Sealed this

Thirty-first Day of January 1984

[SEAL]

Attest:

GERALD J. MOSSINGHOFF

Attesting Officer

Commissioner of Patents and Trademarks